United States Patent

Taybl et al.

[11] Patent Number: 5,114,356
[45] Date of Patent: May 19, 1992

[54] CONNECTING BLOCK FOR THE TELECOMMUNICATION AND DATA TECHNOLOGY

[75] Inventors: Christa Taybl; Manfred Müller; Dieter Gerke; Harald Bülow, all of Berlin, Fed. Rep. of Germany

[73] Assignee: Krone AG, Berlin, Fed. Rep. of Germany

[21] Appl. No.: 668,195

[22] Filed: Mar. 12, 1991

[30] Foreign Application Priority Data

Mar. 13, 1990 [DE] Fed. Rep. of Germany ....... 4008386
Mar. 13, 1990 [DE] Fed. Rep. of Germany ....... 4008388

[51] Int. Cl.⁵ ............................................. H01R 13/60
[52] U.S. Cl. .................................... 439/133; 439/724
[58] Field of Search ............... 439/131, 372, 712, 713, 439/724

[56] References Cited

U.S. PATENT DOCUMENTS 4,767,354  8/1988  Saligny ................................. 439/724
4,986,762  1/1991  Keith ................................... 439/131

Primary Examiner—Paula A. Bradley
Attorney, Agent, or Firm—McGlew & Tuttle

[57] ABSTRACT

The invention relates to a connecting block for connecting insulated cable conductors, in particular cable conductors of the telecommunication and data technology, comprising insulation displacement contact elements received in block bodies and arranged in lines. In order to provide a connecting block (1), wherein it is at any time possible to connect or disconnect cable conductors, without the block body (3, 4) impeding the connection of the cable conductors to the other block body (3, 4), at least one block body (3, 4) is provided with an axis of rotation (5), about which the block body can be swung out off the connecting block (1) or a connector arrangement is provided allowing relative movement between the block bodies.

14 Claims, 11 Drawing Sheets

CONNECTING BLOCK FOR THE TELECOMMUNICATION AND DATA TECHNOLOGY

FIELD OF THE INVENTION

The invention relates to a connecting block for connecting insulated cable conductors, in particular cable conductors of telecommunication and data technology systems, including insulation displacement contact elements received in block bodies and preferably arranged in lines.

BACKGROUND OF THE INVENTION

A connecting block of the above mentioned type is known in the art from German Patent DE-PS 32 01 894. The connecting block comprises three block bodies, which are placed one on top of the other, and are plugged onto tongues extending through latch devices at the two front sides of the block bodies. The upper and lower block bodies are provided with insulation displacement contact elements, which are arranged one behind the other in a line. Each insulation displacement contact comprises two resilient contact legs limiting a central contact slot. An insulated cable conductor to be wired is pressed by means of a tool into the contact slot. The sharp edges of the contact legs cutting through the insulation of the cable conductor, and establishing an electrical contact with the conductive core of the cable conductor. Inserting and pressing-in of the insulated cable conductor into the contact slot is performed from the top of the each block body in the direction of its bottom side. For connecting a cable conductor, the top side or connection side of each block body must therefore be left free. With the known connecting block, it is disadvantageous when connecting the insulated cable conductors to the insulation displacement contact element of the central block body, that first the upper block body has to be removed from the tongues. Then, only, the top side of the central block body is accessible, in order to establish the contact of the cable conductors with the insulation displacement contact elements. Later rearrangements of the cable conductors connected already to the central block body are not possible, since the cable conductors connected to the upper block body prevent the removal of the upper block body. Furthermore, the lateral tongues for plugging the three block bodies on are required as additional components.

SUMMARY AND OBJECTS OF THE INVENTION

It is a primary object of the invention, therefore, to provide a connecting block of the above-mentioned type in a simple construction, wherein the connection of cable conductors to the insulation displacement contacts of the block bodies is possible, without one block body impeding the connections of the other block body.

According to the invention, at least one block body is provided with an axis of rotation, about which the block body can be swung out and off the connecting block. The swinging out is performed about the longitudinal axis of the connecting block. Thus it is achieved that the upper or connecting sides of each block body are freely accessible for connecting or disconnecting cable conductors. Thus, cable conductors can be connected, rearranged and removed, without the connecting sides of the two block bodies impeding each other. Further, utilization of additional components as, e.g., plug-on tongues, is not required anymore.

The connecting block according to the upper block body is provided, according to the invention, with contact lugs projecting from its bottom side, and the lower block body is provided with central contracts and with carry-off contacts, and the contact lugs of the upper block body can be plugged onto the central contacts of the lower block body, thus forming a contact connection between the connecting contacts of the upper and lower block bodies. Herein, in particular additional components as, e.g., plug-on tongues, are not used, and the lines of insulation displacement contacts disposed on the upper sides of the two block bodies are freely accessible for connecting, rearranging and removing cable conductors. In a particularly preferred manner, the lines of the insulation displacement contact elements of the two block bodies are arranged offset relative to each other, so that the lines of the insulation displacement contact elements of the lower block body are freely accessible, even with the plugged-on upper block body.

According to a preferred embodiment of the invention, the connecting contacts of the incoming and outgoing cable conductors remain permanently connected. The contacts may either be checked by a test tapping section upon insertion of a test connector into the insertion opening of the upper block body or the contacts may be disconnected, with the formation of a separation point, by insertion of disconnect connectors. The incoming cable conductors are, according to the invention, already protected by surge arresters connected to the carry-off contacts. The outgoing cable conductors are protected, after insertion of the upper block body into the lower block body, by the contact connection over the contact lugs and the central contacts with the carry-off contacts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
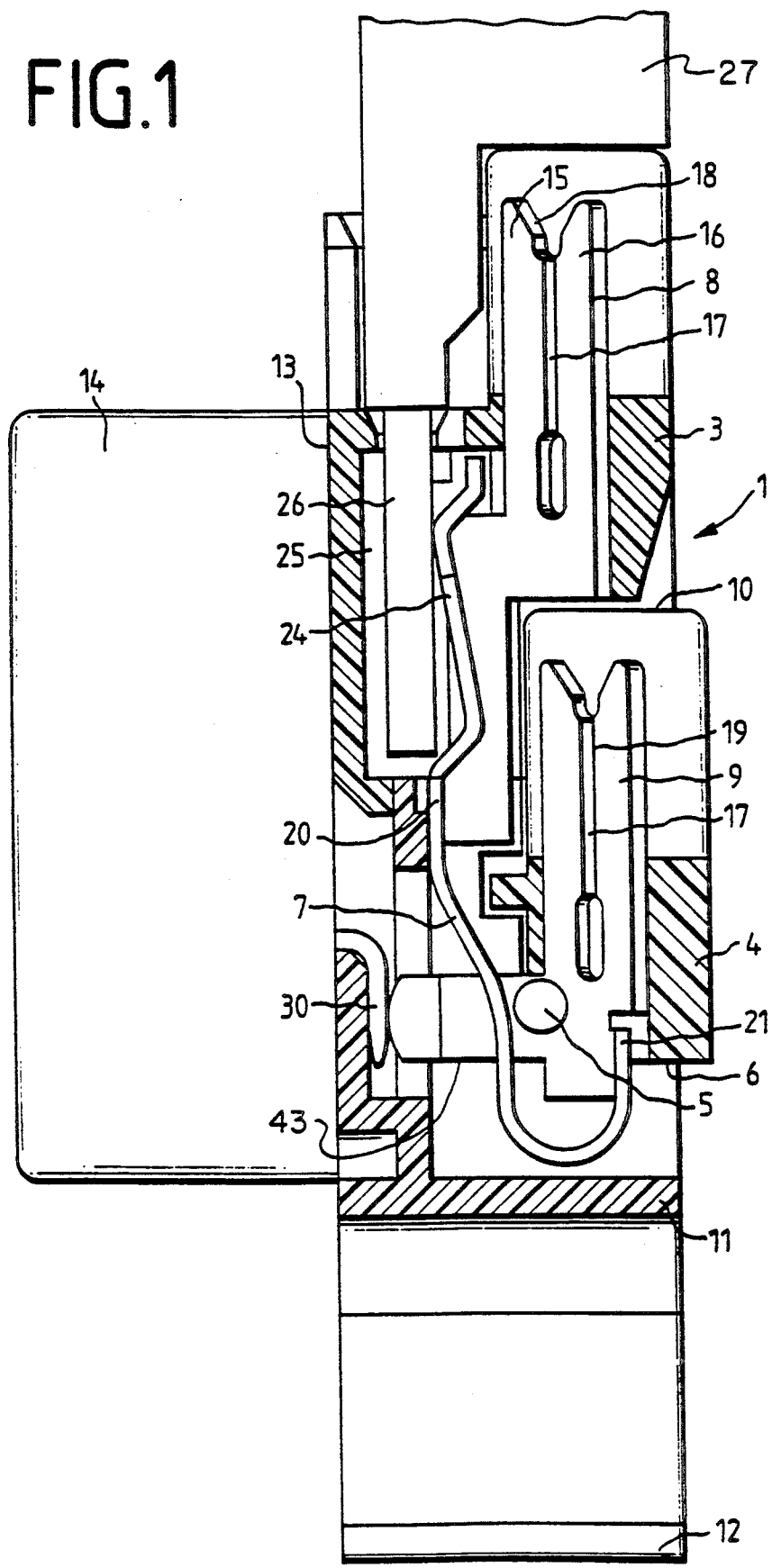
FIG. 1 is a cross sectional view taken through a connecting block according to a first embodiment of the invention.

The first embodiment of the connecting block 1 as shown in FIGS. 1 to 5 comprises a housing body made of plastic with two block bodies 3, 4. At the bottom side 11 of the connecting block 1 there are provided curved clamping elements 12 for attachment on non-shown rod-type guide rails. The block bodies 3, 4 receive several lined-up insulation displacement contact elements 8, 9 made of a metal material and including two resilient contact legs 15, 16 limiting a contact slot 17. For easy introduction of a cable conductor into the contact slot 17, each insulation displacement contact element 8, 9 has an inclined introduction section 18 at the upper end. The cable conductor to be connected is introduced from the upper side of the block bodies 3, 4 into the respective insulation displacement contact element 8, 9, and is pressed-in, in the direction of the lower side of each block body 3, 4, into the respective contact slot 17, so that the sharp edges 19 of the contact legs 15, 16 cut into the insulation of the cable conductor and penetrate into the conductive core of the cable conductor. This establishes an electrical contact between the insulation displacement contact element 8, 9 and the cable conductor.

FIG. 1 shows the two block bodies 3, 4, which are arranged on top of each other in the connecting block 1. Connected to the insulation displacement contact elements 9 of the lower block body 4 are cable conductors or switching conductors of the incoming side. Connected to the insulation displacement contact elements 8 of the upper block body 3 are cable conductors or jumper conductors of the outgoing side. The electrical connection between the insulation displacement contact element 8 of the upper block body 3 and the insulation displacement contact element 9 of the lower block body 4 is achieved over a connecting element 7 of a resilient metal strip or tape, the ends 20, 21 of which are each connected with the insulation displacement contact elements 8, 9. With the connecting element 7 there is connected a spring tongue 24 extending into an insertion channel 25 of the connecting block 1. The insertion channel serves for accommodation of a plug-in tongue 26 of a test connector 27, which is, after introduction, electrically connected over the spring tongue 24 with the insulation displacement contact elements 8, 9.

Figure 5:
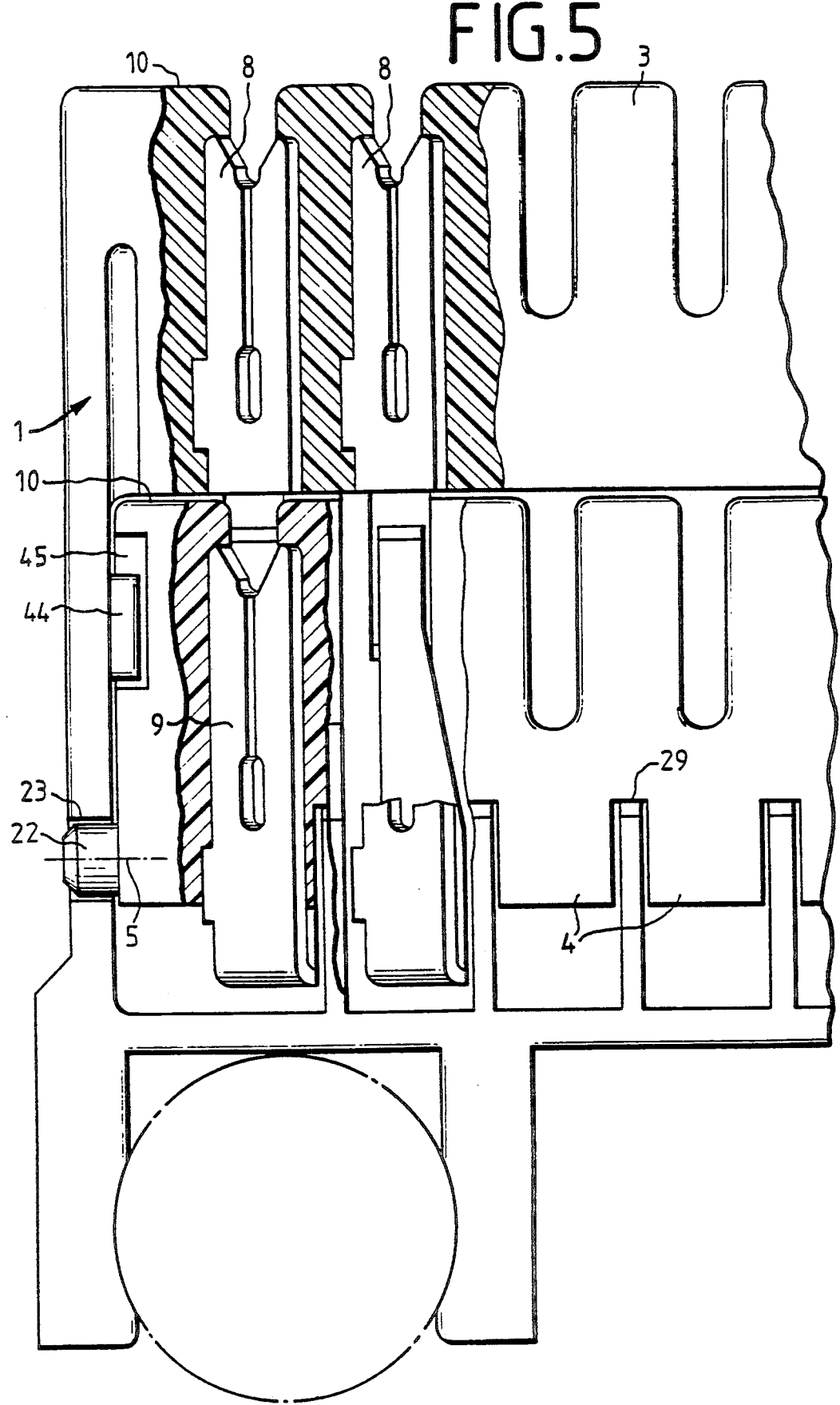
FIG. 5 is a partially sectional view of a portion of a connecting block according to FIG. 1.
Figure 6:
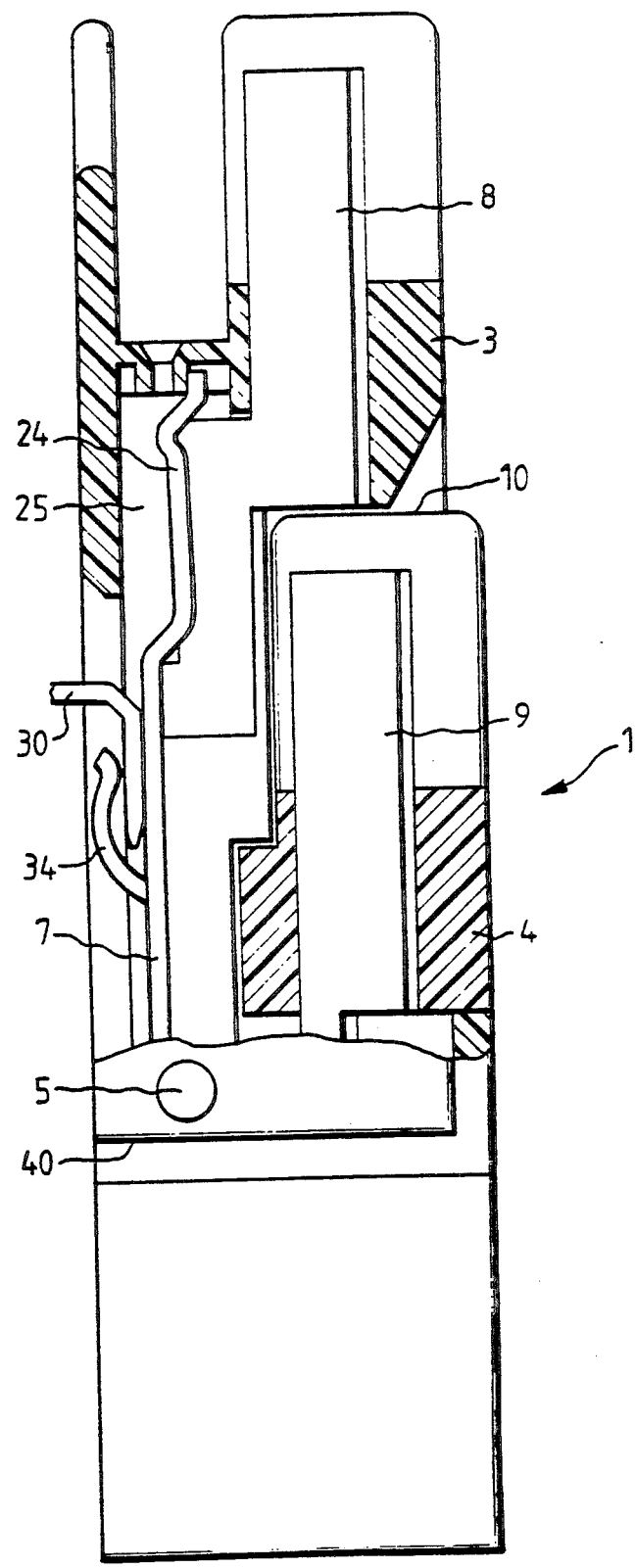
FIG. 6 is a partially sectional front view of a connecting block according to a second embodiment of the invention.

The lower block body 4 comprises, as is shown in particular in FIG. 5, an axis of rotation 5 with journals 22 disposed at the front sides of the lower block body 4, said journals being received in bearing openings 23 of the connecting block 1.

Figure 2:
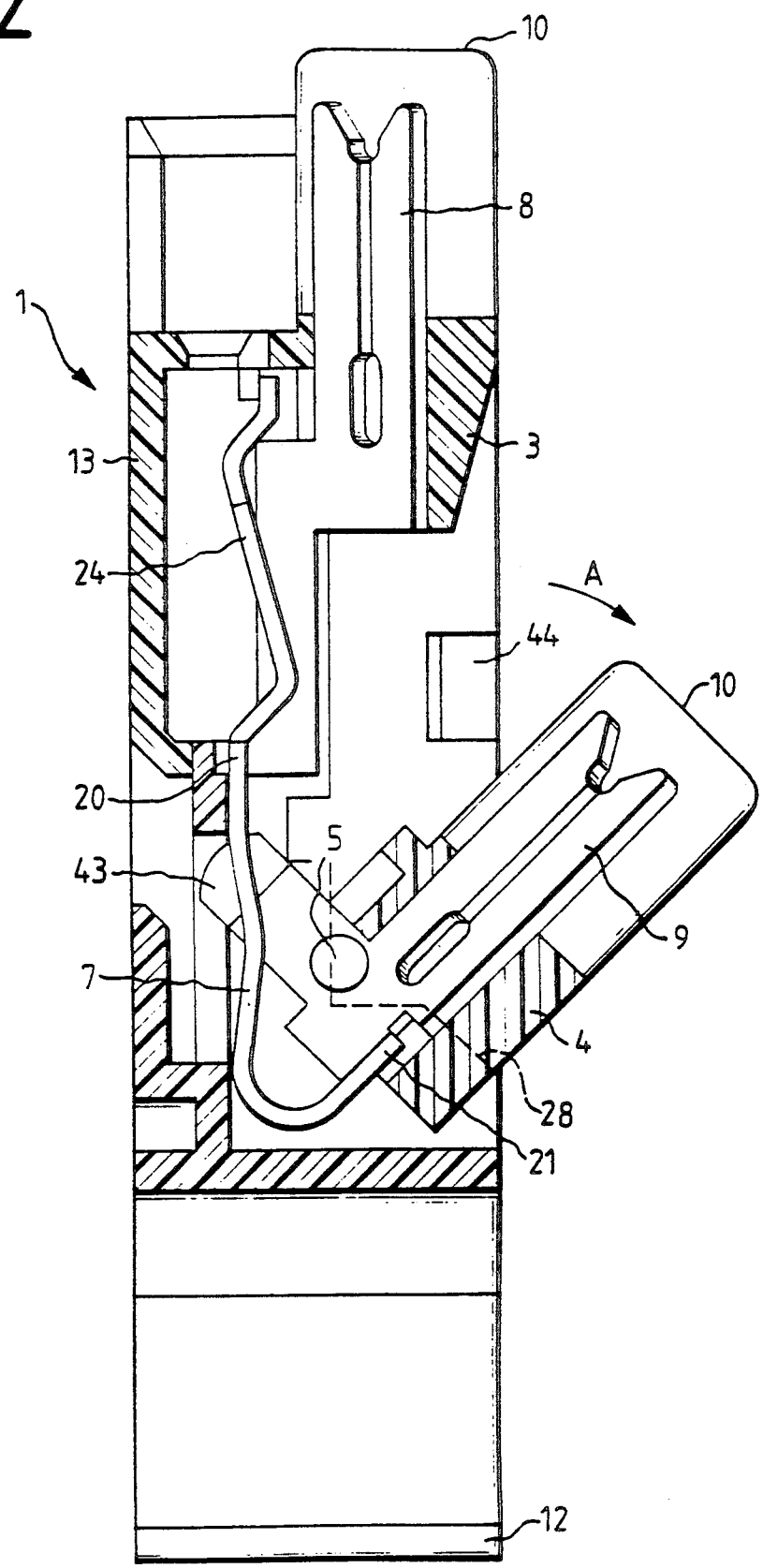
FIG. 2 is a cross sectional view taken through the connecting block according to FIG. 1 with a swung-out lower block body.

For connecting the insulated cable conductors to the insulation displacement contact elements 9 of the lower block body 4, the latter is, as shown in FIG. 2, swung out in direction of the arrow A toward front of the connecting block 1. After swinging the lower block body 4 out, its connecting side 10 is freely accessible, in order to insert the insulated cable conductors into the contact slots 17 and to press them in from top by means of a non-shown tool into the contact slots 17. After connecting all insulation displacement contact elements 9, the lower block body 4 is swung back into the connecting block 1, until it comes back into the original position shown in FIG. 1. As is shown in FIG. 2, the resilient connecting element 7 is pressed, because of the swing movement of the lower block body 4, in direction of the rear side 13 of the connecting block 1. In order to prevent the lower block body 4 from further swinging out, a stop 28 is provided in the connecting block 1, against which rests a slot edge 29 of the lower block body 4 (see FIG. 5). An extension 43 serves for contacting a surge arrester magazine 14, via contact tongue 30, disposed at the rear side 13 of the connecting block 1 (FIG. 1). At the internal sides of the internal faces of the accommodation opening for the lower block body 4 provided in the connecting block 1, latch hooks 44 are arranged, which snap into free spaces 45 of the lower block body 4 after swinging the lower block body 4 back.

After connecting the incoming cable conductors to the insulation displacement contact elements 9 of the lower block body 4, the outgoing cable conductors are connected to the insulation displacement contact element 8 of the upper block body 3 forming an integral component of the body of the connecting block 1.

Figure 3:
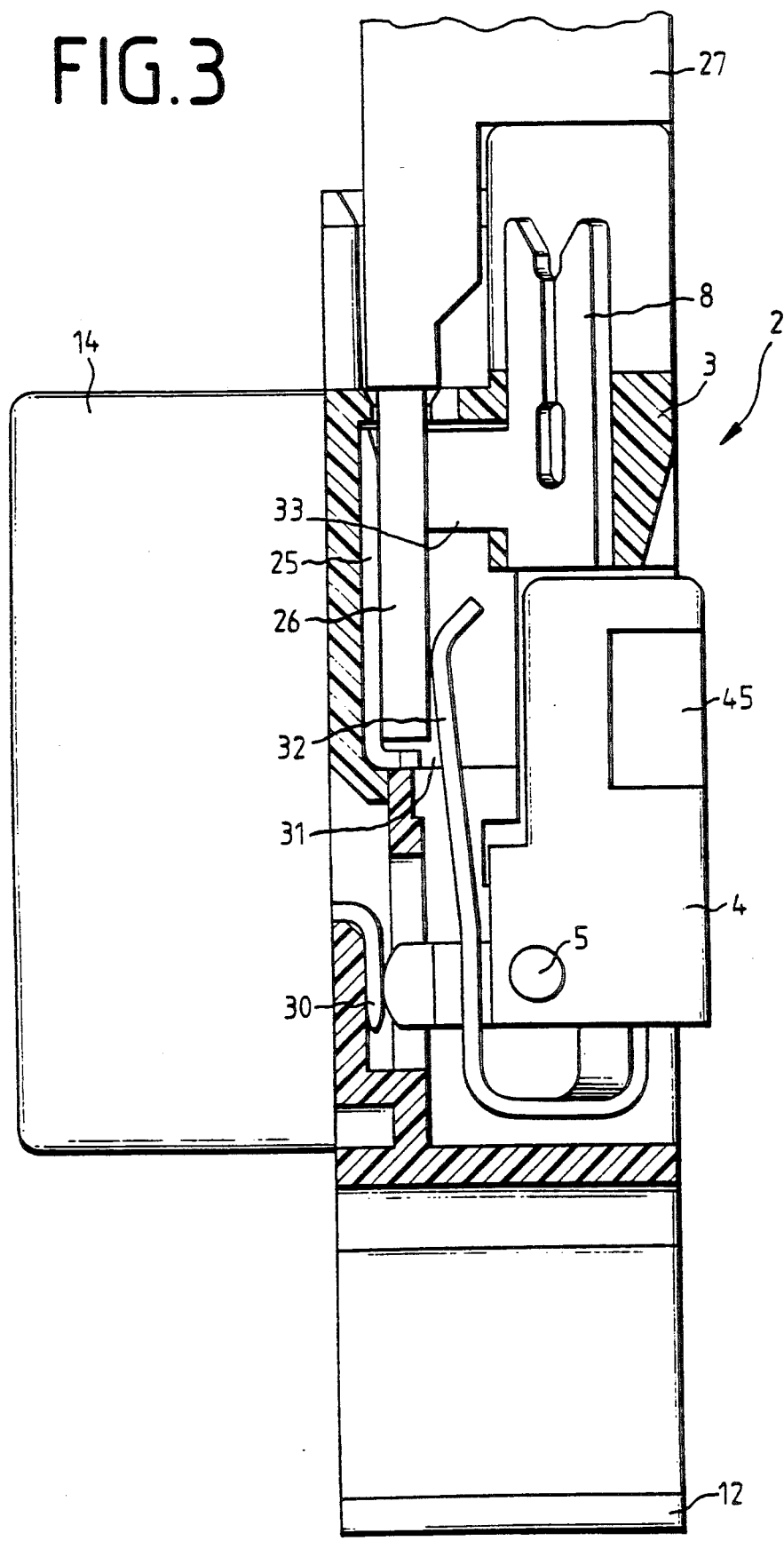
FIG. 3 is a cross sectional view taken through the connecting block according to FIG. 1 adapted as a disconnecting block.
Figure 4:
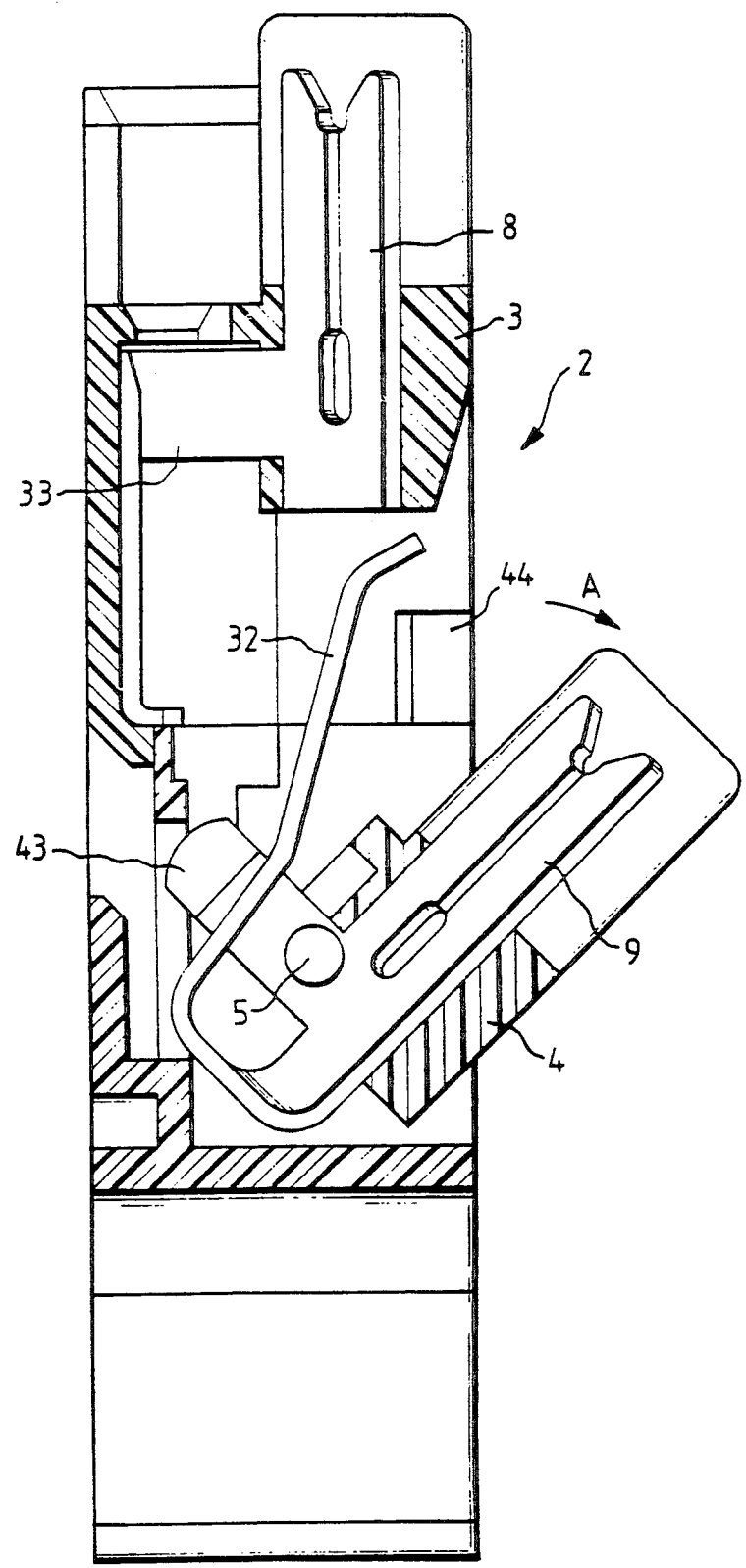
FIG. 4 is a cross sectional view taken through the connecting block according to FIG. 3 with a swung-out lower block body.

In FIGS. 3 and 4, the connecting block 1 adapted as a disconnecting block 2, according to the embodiment shown in FIG. 1, is represented. The disconnecting block 2 comprises, between the insulation displacement contact elements 8, 9, a separation point 31, for which purpose the insulation displacement contact element 9 includes a spring tongue 32 extending into the insertion channel 25, and contacting the plug-in tongue 26 of a connector, in particular of a test connector 27. The insulation displacement contact element 8 of the upper block body 3 has a contact lug 33 also extending into the insertion channel 25, and contacting the plug-in tongue 26 of the test connector 27, when the latter is plugged into the disconnecting block 2. With this disconnecting block 2 according to FIGS. 3 and 4, the lower block body 4 can be swung out toward the front in direction of the arrow A for connecting cable conductors, the lower block body 4 being also swung about the axis of rotation 5, as is shown in FIG. 4.

In FIGS. 6 to 9, the second embodiment of the connecting block 1 is shown. Herein, in contrast to the first embodiment described above, the lower block body 4 is an integral component of the connecting block 1, whereas the upper block body 3 can be swung about axis of rotation 5, in order to make the connecting field 10 of the lower block body 4 accessible for connecting the insulated cable conductors. The connecting block 1 according to FIG. 6 comprises the two block bodies 3, 4 with one line each of insulation displacement contact elements 8, 9, the two lines of the two block bodies 3, 4 being connected over the resilient connecting element 7. At the insulation displacement contact element 8, there is provided the spring tongue 24 extending into the insertion channel 25, which is disposed in the upper block body 3. The spring tongue 24 is extended downwardly, and includes a contact receiving section 34, into which the contact tongue 30 of the surge arrester magazine 14 is inserted.

Figure 7:
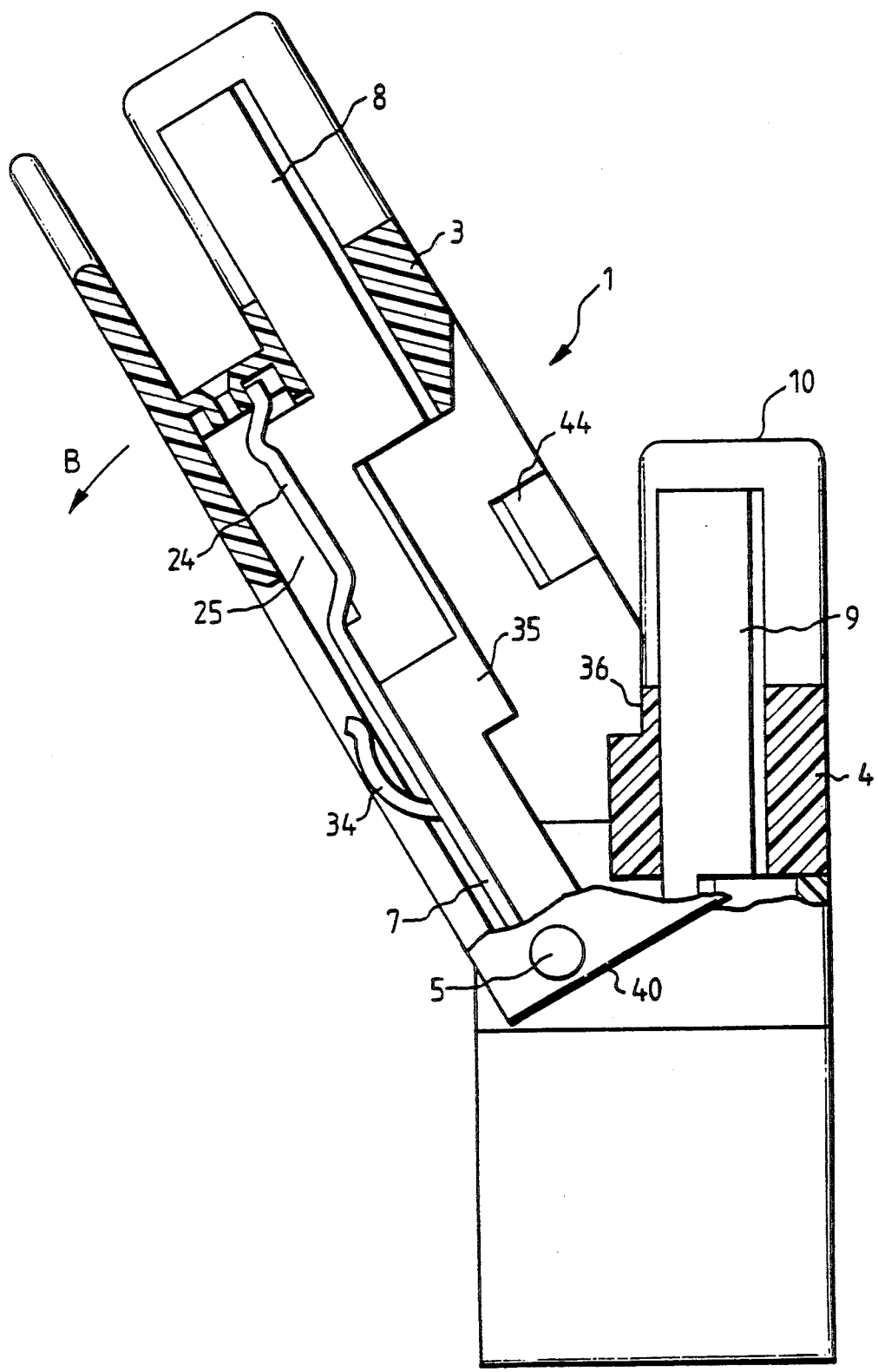
FIG. 7 is a front view of the connecting block according to FIG. 6 with a swung-out upper block body.

For connecting the insulated cable conductors to the lower block body 4, the latter is, as shown in FIG. 7, swung out in direction of the arrow B about the axis of rotation 5. The axis of rotation 5 is in the area of the bottom side 40 of the upper block body 3. After swinging the latter out, the connecting side 10 of the lower block body 4 is freely accessible, in order to insert the insulated cable conductors from above into the contact slots 17 of the lower block body 4 and to press them in from top by means of a non-shown tool into the contact slots 17 of the insulation displacement contact elements 9. After connecting all cable conductors to the insulating displacement contact elements 9 of the bottom block body 4, the upper block body 3 is swung back, until the stop 35 of the insertion opening of the upper block body 3 rests against the rear wall 36 of the lower block body 4. Now, the upper block body 3 has come back into its original position, the upper block body 3 being latched again with the connecting block 1 or with the lower block body 4 over the latch hooks 44 snapping into the free spaces 45.

Figure 8:
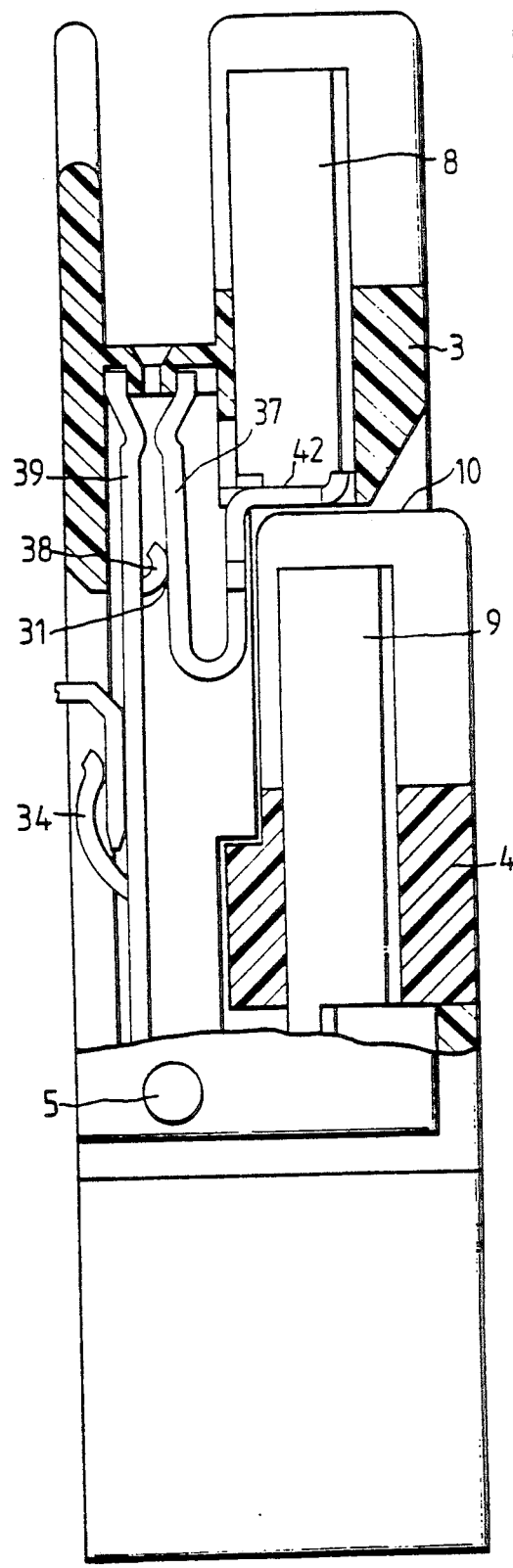
FIG. 8 is a partially sectional front view of the connecting block according to FIG. 6 adapted as a disconnecting block.
Figure 9:
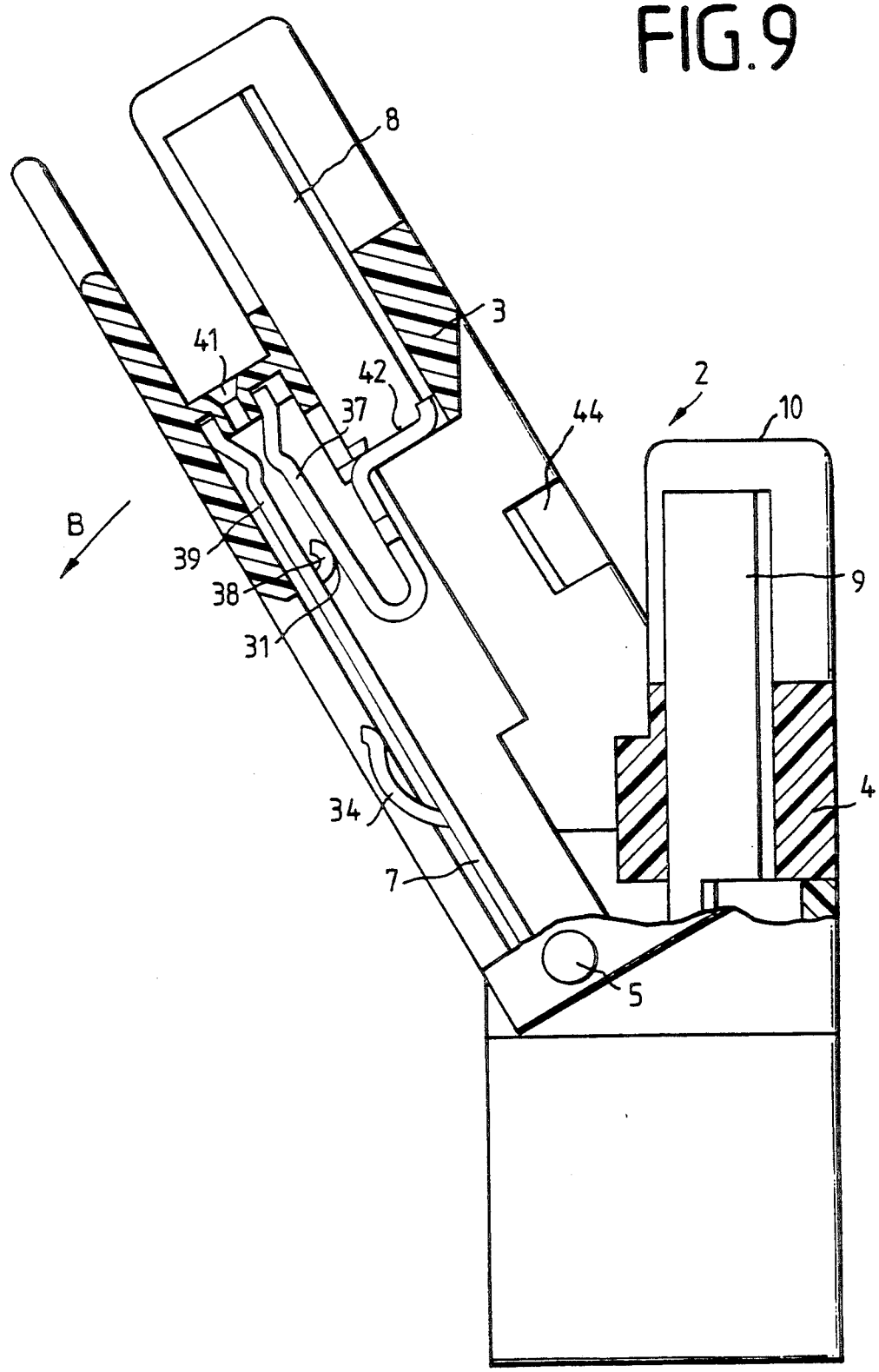
FIG. 9 is a partially sectional front view of the disconnecting block according to FIG. 8 with a swung-out upper block body.

In FIGS. 8 and 9, the second embodiment of the connecting block 1, adapted as a disconnecting block 2, is represented. The disconnecting block 2 also comprises two block bodies 3, 4, the upper block body 3 being pivotally mounted at the connecting block or at the lower block body 4, respectively. The insulation displacement contact element 8 of the upper block body 3 comprises at its lower side 42 one contact spring tongue 37 each resting resiliently against a counter contact 38 connected with a contact leg 39, which, in turn, is connected over the connecting element 7 with the insulation displacement contact element 9 of the lower block body 4. Between the counter contact 38 and the spring tongue 37, a separation point 31 is formed which can be disconnected by means of a non-shown separation connector being insertable through the opening 41 of the disconnecting block 2. The contact leg 39 has a contact receiving section 34, into which the contact tongue of the surge arrester magazine 14 can be inserted. As is shown in FIG. 9, the upper block body 3 in the disconnecting block 2 can also be swung out in the direction of the arrow B, so that connecting of the lower block body 4 is freely accessible.

In the second embodiment of the connecting block 1 shown in FIGS. 6 to 9, it is also possible to adapt the journal 22 as insertable into the bearing opening 23, so that the upper block body 3 is supported insertably and rotatably in the axis of rotation 5 in the lower block body 4.

Figure 10:
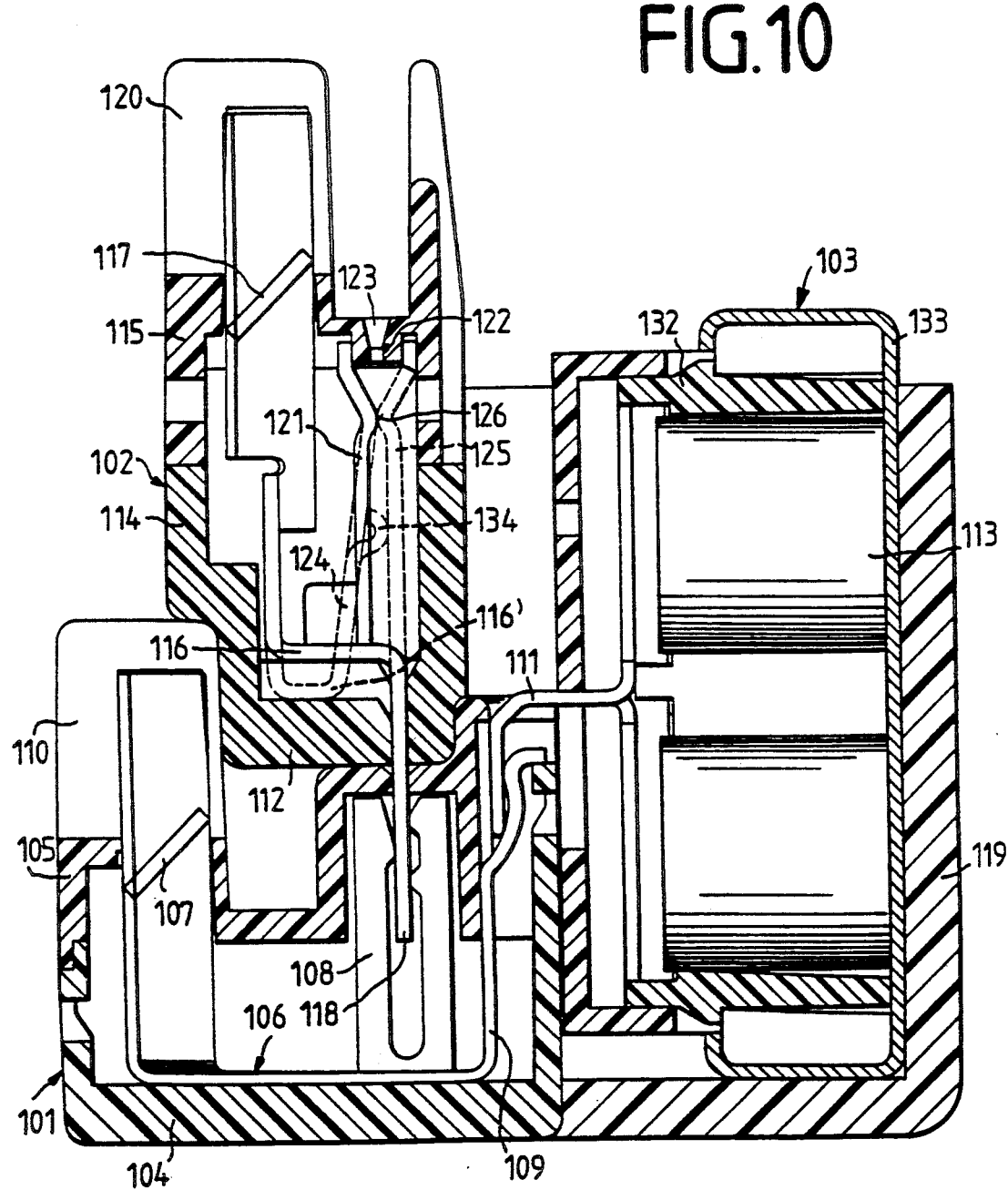
FIG. 10 is a cross sectional view taken through a connecting block according to a third embodiment of the invention.
Figure 11:
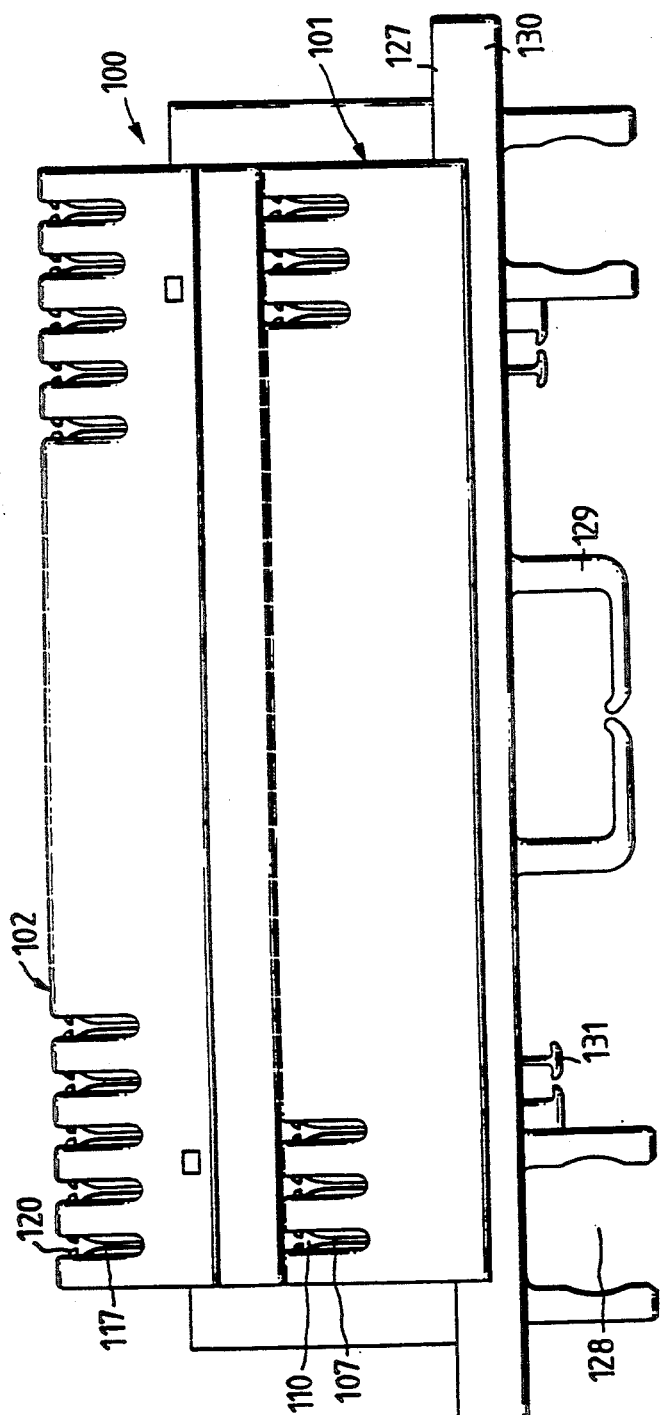
FIG. 11 is a side view of the connecting block according to FIG. 10.
Figure 12:
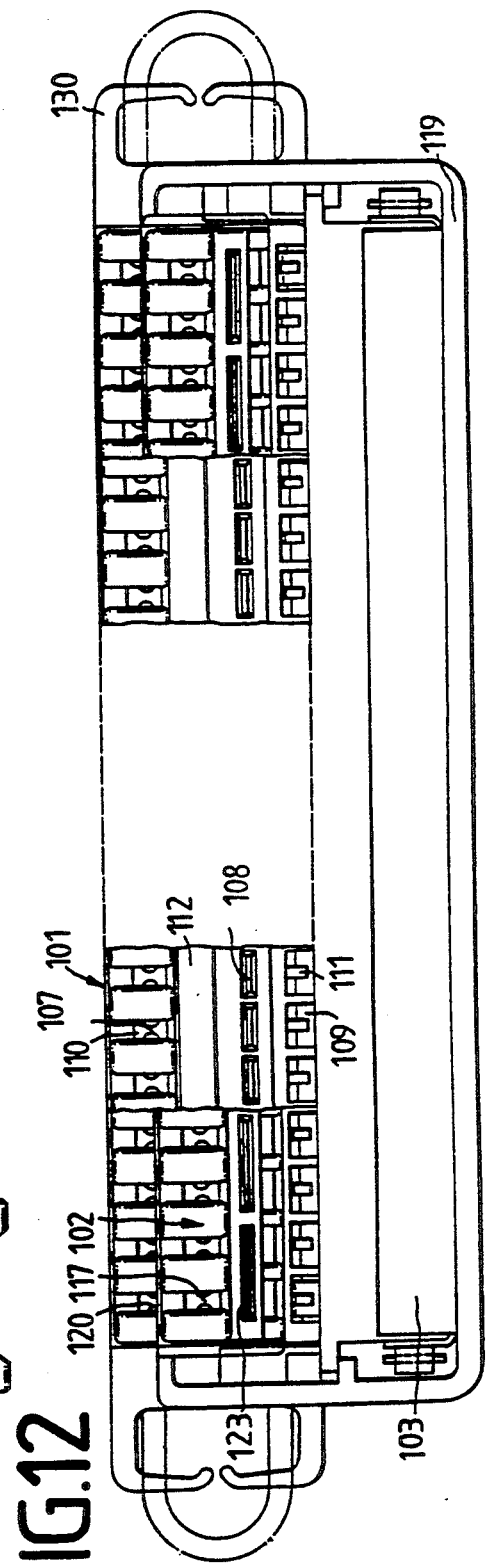
FIG. 12 is a top view of the connecting block according to FIG. 10, partially showing only the lower block body.

The third embodiment of a connecting block 100 for cable conductors of the telecommunication technology shown in FIGS. 10 to 12 comprises a lower block body 101, to which is flanged a surge arrester magazine 103, and an upper block body 102.

The housing of the lower block body 101 comprises a lower section 104 and an upper section 105 made of plastic and latched with each other. The lower block body 101 accommodates a line of connecting elements 106 each including an insulation displacement contact element 107, a fork-type central contact 108, and a carry-off contact 109. To each insulation displacement contact is assigned a clamping slot 110 in the housing of the lower block body 101, wherein a non-shown incoming cable conductor can be connected when contacting with an insulation displacement contact element 107. The surge arrester magazine 103 engages with its magazine contacts 111 into the carry-off contacts 109 of the connecting elements 106, and thereby protects each individual connecting element 106 by means of the surge arresters 113 of the surge arrester magazine 103. In the upper side of the lower block body 101, a receiving channel 112 extending in the longitudinal direction thereof is provided for inserting the lower side of the upper block body 102.

The upper block body 102 comprises a housing with a lower section 114 and an upper section 115 being each made of plastic, and being latched with each other. In the upper block body 102 are received connecting elements 116 being each formed of an insulation displacement contact element 117 and of a contact lug 118 electrically connected therewith. The contact lugs 118 of the upper block body 102 engage, when inserting the latter into the lower block body 101, into the respective fork-type central contacts 108 of the lower block body 101, as is shown in FIG. 10. The insulation displacement contact elements 117 of the upper block body 102 are provided in the area of clamping elements 120 in the housing of the upper block body 102. The clamping elements clamp the outgoing cable conductors to be connected fast when connecting the insulation displacement contact elements 117 of the upper block body 102.

The upper block body 102 is provided with a direct connection of the insulation displacement contact elements 117 with the contact lugs 118, as is shown in FIG. 10 in solid lines. The connecting elements 116 is formed as one piece and is made, together with the contact lug 118, as a double-bent metal strip or tape.

For forming a tapping section for testing, the contact lug 118 is provided with a test contact lug 121 extending in direction of the insulation displacement contact element 117, said test contact lug resting against the external side of a wall portion 122 limiting an insertion opening 123 formed in the upper side of the upper block body 102. Thus, it is possible to insert a test connector through the insertion opening 123 into the upper block body 102, said test connector contacting the test contact lug 121 and thus the connecting element 116.

As is shown in FIG. 1 with dashed lines, the insulation displacement contact elements 117 of the upper block body 102 and the contact lugs 118 thereof can each be provided with contact springs 124, 125, which form, underneath the insertion opening 123, a separation point 126 for inserting a separation connector. A contact finger 134 at the contact spring 124 establishes the contact connection to the contact spring 125. Both contact springs 124, 125 rest with their free ends resiliently against the external sides of the wall portions 122 limiting the insertion opening 123. By inserting separation connectors into the insertion openings 123, the separation points 126 of the connecting elements 116 can be disconnected. By inserting test connectors, the contact connections between the insulation displacement contact elements 107, 117 are led over the test connectors. The thus adapted connecting block 100 forms a disconnecting block.

The connecting block 100 composed of the lower block body 101 and of the upper block body 102 comprises a chassis 127 shown in FIGS. 11 and 12 only with latch elements 128 for snapping onto non-shown parallel support rods. The chassis 127 comprises, further, conductor guidings 129 to 131. For forming a receiving space for the surge arrester magazine 103, a receiving tub 119 of plastic is provided, which extends up to cover the front sides of the connecting block 100 in the area of the conductor guidings 130. The surge arrester magazine 103 is formed of a plastic housing 132 for receiving the surge arresters 113, which rest with the one chassis in the magazine contacts 111 and with the other chassis against an earthing rail 133 surrounding the open lower side of the plastic housing 132.

As is shown in FIG. 10, the planes of the lines of insulation displacement contact elements 107, 117 of the lower block section 101 or of the upper block section 102, respectively, are located is laterally offset planes. Thus, it is possible to have also accessible for connecting the lines of insulation displacement contact elements 107 of the lower block body 101 with mounted upper block body 102, either when the upper block body 102 is made slightly smaller than is shown in FIG. 10, or when the insulation displacement contact elements 107 of the lower block body 101 are arranged slightly inclined.

While specific embodiments of the invention have been shown and described in detail to illustrate the application of the principles of the invention, it will be understood that the invention may be embodied otherwise without departing from such principles.

What is claimed is:

1. A connecting block for connecting insulated cable conductors for telecommunication and data technology systems, comprising a connecting block structure and a block body including insulation displacement contact elements received in the block body and arranged in a line and connecting means for connecting the block body to said connecting block structure including an axis of rotation for swingingly rotating said block body relative to said connecting block structure.

2. A connecting block arrangement according to claim 1, including a second block body arrangement in side-by-side relationship with said block body.

3. A connecting block according to claim 1, including another block body supported by said connecting block structure and electrical connection means for connecting said insulation displacement contact elements of said block body with insulation displacement contact elements of said another block body, including a resilient contacting element.

4. A connecting block arrangement according to claim 1, wherein said axis of rotation is located adjacent a bottom side of said block body.

5. A connecting block arrangement according to claim 1, wherein said connection means includes a journal connected to said one block body and a bearing formed in said connecting block, said journal being inserted into said bearing block for supporting said one block body with respect to said connecting block.

6. A connecting block according to claim 1, including another block body, said another being positioned in a one on top of the other relationship with said block body.

7. A connecting block arrangement according to claim 6, wherein one of said one block body and said another block body is positioned as an upper block body including said connection means for swinging said upper block body with respect to said connecting block.

8. A connecting block arrangement according to claim 6, wherein one of said one block body and said another block body is provided as a lower block body connected to said connecting block by said connection means for swinging said lower block body with respect to said connecting block.

9. A connecting block arrangement for connecting insulated cable conductors of telecommunication and data technology systems, comprising a lower block body defining a space for receiving insulation displacement contacts arranged in a line, said lower block body including central contacts and carry-off contacts; an upper block body defining a space for insulation displacement contact elements received in said upper block body and arranged in a line, said upper block body including contact lugs projecting from a lower side of said upper block body, said contact lugs of said upper block body being insertable into said central contacts of said lower block body to form a contact connection.

10. A connection block arrangement according to claim 9, wherein said upper block body includes a housing having an insertion opening communication with test connectors, said insertion opening providing access for separation of said test connectors, connecting contact elements of said upper body and said contact lugs of said upper body being directly connected to said test connectors for forming a test tapping section.

11. A connecting block arrangement according to claim 9, wherein said upper block body includes a housing having an insertion opening communication with test connectors, said insertion opening providing access for separation of said test connectors, connecting contact elements of said upper body and said contact lugs of said upper body being directly connected with pairs of contact springs for forming a separation point for inserting separation for test connectors.

12. A connecting block arrangement according to claim 9, wherein a housing forming said lower block body and a housing forming said upper block body are each formed of a lower section and an upper section, said housings each being latched with each other after mounting connecting elements.

13. A connecting block arrangement according to claim 9, wherein carry-off contacts are arranged laterally at said lower block body for receiving plug elements of a surge arrester magazine.

14. A connecting block arrangement comprising an upper block body defining a receiving space for receiving insulation displacement contacts arranged in a line; a lower block body defining a receiving space for receiving insulation displacement contact elements arranged in a line; means for connecting the upper block body to the lower block body to form a connecting block including means for moving one of the upper block body and the lower block body relative to one of the upper block body and the lower block body for providing access to said insulation displacement contact elements arranged in a line and electrical connection means for electrically connecting ones of said insulation displacement contact elements of said upper block body with corresponding ones of said insulation displacement contacts of said lower block body, said electrical connection means maintaining said contact when said upper and lower block bodies are moved relative to each other.

* * * * *